Patented Mar. 9, 1937

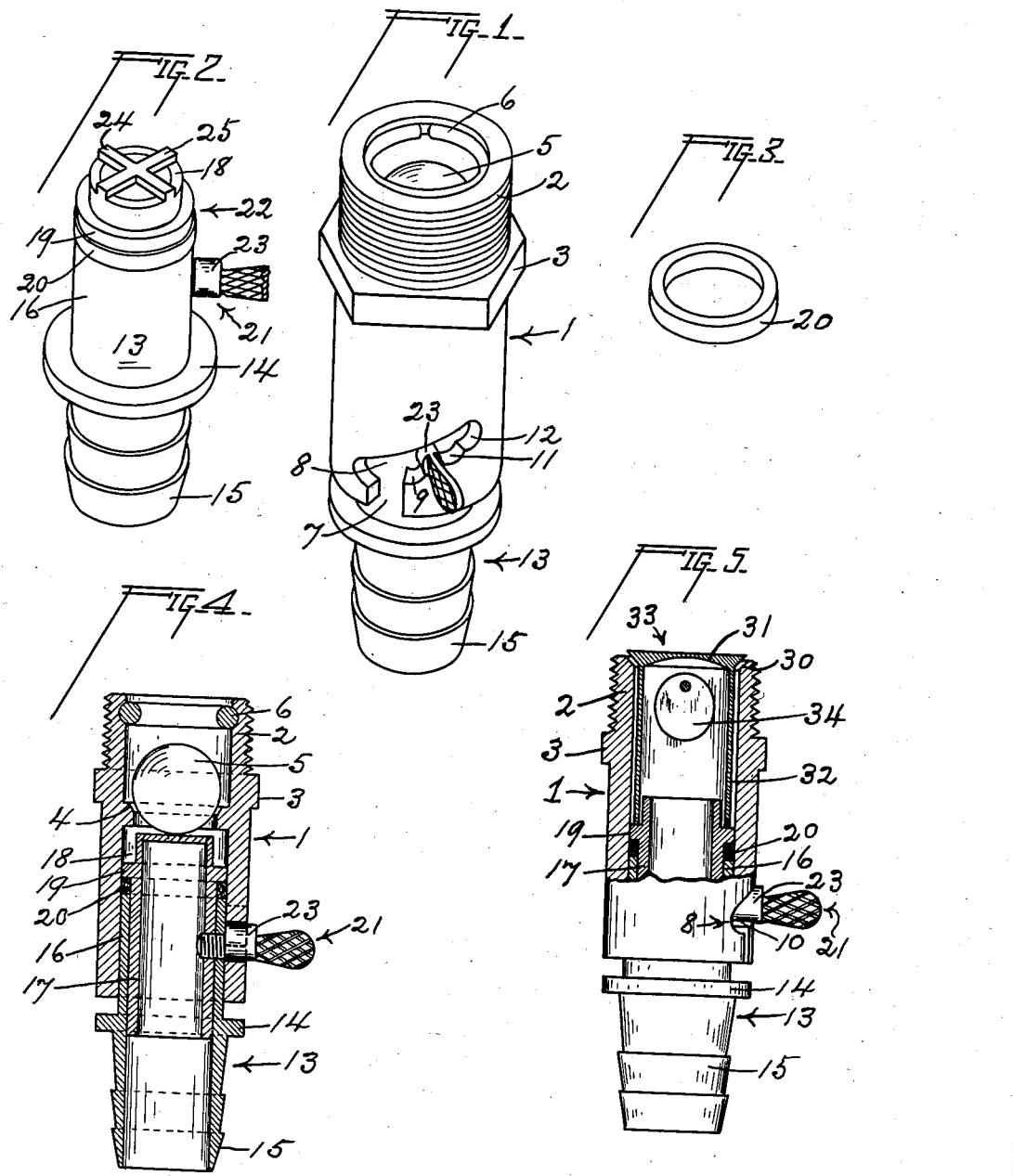

2,073,048

UNITED STATES PATENT OFFICE 2,073,048

SELECTIVE VOLUME CONTROL VALVE

Fred I. Clark, Oklahoma City, Okla.

Application February 15, 1936, Serial No. 64,073

7 Claims. (Cl. 284—18)

My invention relates to control valves and more particularly to selective volume control valves, one use for which would be in a usual aerating system in connection with the manufacture of clear raw water ice; another use for which would be in the air systems of gasoline filling stations.

In the manufacture of clear ice it is desirable to reduce the volume of air passing into the freezing water after the core water has been removed from the partially frozen ice blocks. This reduction hastens freezing during the latter part of the freezing period and eliminates "white core" and ragged edges at the top of the ice blocks. In addition to the desirability of reducing the volume of air, it is also desirable to have a quick means of detaching the air laterals of an ice manufacturing system from the air header in a manner which will prevent the loss of air from the header pipe. At present a control valve is needed to accomplish the former desirable feature, and a separate check valve with taper insert hose connection is needed to accomplish the latter desirable feature. At times the insert accidentally is loosened from the check valve, the air escaping between the two instead of passing through the feeder line, and the loss of all ice blocks fed by that particular line is the result.

For filling station use it is common at present to use an ordinary threaded pipe connection to connect outside air hose to outside supply line connections. The time necessary to connect and disconnect the outside air hose causes most operators to leave the air hose outside the station at night. Hose is often stolen or damaged because left out after the station has closed. A quick and easy means of attaching the air hose to the supply line would allow the operator to take the air hose inside each night.

The objects of my invention are to provide a valve which is new, novel, practical, and of utility; one portion of which may be attached to a feeder line and the other portion to a supply line; which will separate into two parts allowing quick and easy disconnection of the feeder line from the supply line without loss of volume or pressure from the supply line; which is selectively adjustable to allow a number of different predetermined volumes to pass therethrough, providing a constant pressure is maintained in the supply line; which will control or stop the volume passing therethrough regardless of pressure in the supply line; which will preclude the necessity of using a separate control valve and a separate check valve to properly control air supplied to ice cans in the manufacture of ice; which will allow quick and easy connection and disconnection of air hose commonly used in filling stations from the supply line; which may be used in either a water or air line; which may be used in either a high or low pressure line; which may be used to connect a water nozzle to a water hose; and which will be efficient in accomplishing all the purposes for which it is intended.

With these and other objects in view as will more fully appear hereinbelow, my invention consists in the construction, novel features, and combination of parts hereinafter more fully described, pointed out in the claims hereto appended, and illustrated in the accompanying one-sheet drawing, of which, Figure 1 is a perspective view of the device assembled;

Figure 2 is a perspective view of the valve stem assembly of one embodiment of the device;

Figure 3 is a perspective view of the packing ring;

Figure 4 is a sectional view of the ball valve embodiment of the device; and,

Figure 5 is a sectional view of the barrel valve embodiment of the device.

Like characters of reference designate like parts in all the figures.

It is understood that various changes in the form, proportion, size, shape, weight, material and other details of construction, within the scope of my invention may be resorted to without departing from the spirit or broad principle of my invention and without sacrificing any of the advantages thereof; and it is also understood that the drawing is to be interpreted as being illustrative and not restrictive.

The inventive idea involved is capable of receiving a variety of mechanical expressions one of which, for the purpose of illustrating the invention, is shown in the accompanying drawing wherein referring more particularly to the embodiment shown in Figs. 1, 2 and 4:

Numeral 1 designates a hollow valve body, which is exteriorly threaded at one end 2, and adjacent said threads has an external polygonal shoulder 3 for ease in attaching said body 1 to a supply line. The interior bore of said body 1 is substantially of the same diameter throughout with the exception of a constriction near the location of the external shoulder 3. This constriction in the bore forms an annular tapered valve seat 4 for seating a ball 5, made preferably of aluminum alloy, or some light wear resisting material. The ball 5 is held within the open end 2 of the body 1 by an annular retaining ring 6, which seats in an annular recess in the walls of said body 1.

Through the wall of its opposite end the body 1 is provided with a short open end slot 7 running lengthwise of the body 1. The inner end of slot 7 connects with one end of a slot 8, which partially extends around the body 1 at an angle of greater than 90° to said slot 7. The inner edge of said slot 8 is in the form of a smooth helical surface. The outer edge of slot 8 is substantially parallel to the inner edge but is serrated to form a plurality of notches 9, 10, 11 and 12 each of which presents a curved surface. (The edge of notch 10 can be seen in Fig. 5.) The purpose of the slots and notches above mentioned will be later described hereinafter.

A substantially cylindrical male member 13 has an exterior annular shoulder 14 intermediate its ends. One end 15 is notched to form an ordinary hose connection. This end may also be threaded for pipe connection if desired. The other end 16 is cylindrical and its exterior surface is machined accurately and finished smooth to within .001" of the inside diameter of the slotted end of valve body 1.

A plunger 17 (Figs. 4 and 5) has adjacent its caged end 18 an exterior annular shoulder 19 of the same outside diameter as the end 16 of the male member 13. From the shoulder 19 to its opposite end the plunger 17 is cylindrical, and of a diameter to fit tightly inside the cylindrical bore of male member 13. An annular packing gland 20 of suitable material fits tightly on said plunger 17 adjacent the shoulder 19. In assembled relation the plunger 17 fits inside the end 16 of body 1, and the packing gland 20 is held firmly between the shoulder 19 and the upper end 16 of the body 1. These parts assembled form the complete valve stem 22. Their assembled relation is maintained by an eccentric control key 21, one end of which is threaded and screws into aligned and threaded through perforations in the walls of the two. The circumference of the packing gland 20 is slightly larger than the circumference of the bore in the slotted end of body 1 and makes an air tight seal with the smooth interior surface of said body 1 when the assembled valve stem 22 (Fig. 2) is inserted therein. The caged end 18 of plunger 17 is formed with cross bars 24 and 25 bridging it, as shown in Fig. 2. These cross bars are for the purpose of contacting the ball 5 and pushing the ball away from the seat 4, as in Fig. 4, thus allowing liquid or air to pass through the valve and between the cross bars into the central bore of the valve stem.

The control key 21 has an elliptical eccentric shoulder 23 intermediate its handle and its threaded end. This shoulder 23 is adapted to seat firmly on the notches 9, 10 (notch 10 is the one on which the shoulder 23 is seated in Figs. 1, 4 and 5), 11, and 12 regardless of which portion of its surface contacts said notches.

In operation the end 2 of the body 1 is connected to a supply line. Even as little as one-half pound pressure in the supply line will cause ball 5 to seat on seat 4, and prevent the escape of air or water through the ball valve. The end 15 of valve stem 22 is connected to the end of a leader line hose. When it is desired to pass air or liquid into the leader line the free end 18 of the assembled valve stem 22 is inserted in the slotted end of the body 1. The shoulder 23 of key 21 passes through the slot 7 into the slot 8. The handle of the key 21 should be turned to lie in a plane parallel to the slot 8. If a maximum amount of air or liquid volume is desired the stem 22 is turned in a clockwise direction until the long end of shoulder 23 seats in notch 12. As the stem 22 is turned clockwise the stem necessarily penetrates further into the body 1, the caged end 18 pushing ball 5 away from its seat 4. In manufacture, my ball valve will be made with a maximum valve passage area at least equal to the full inside area of the bore in plunger 17. With the shoulder 23 turned crosswise in slot 8, the stem 22 is firmly locked to the body 1. There can be no relative rotation of the two because the transverse axis of the elliptical shoulder 23 is too great to allow it to pass the inwardly projecting edge of the notch 12. It will be seen that by turning the key 21 so that the short end of the shoulder 23 seats on notch 12, the locked relation of stem 22 and body 1 would be maintained, but that the stem 22 would not project as far into the body 1, the end 18 would allow ball 5 to approach a little nearer its seat and the valve passage area would be slightly reduced.

By turning key 21 so that the transverse axis of the elliptical shoulder 23 is parallel to the slot 8, the shoulder 23 may pass between the inwardly projecting edges of the various notches and the smooth side of slot 8, making it possible to turn the stem 22 counterclockwise with relation to the body 1, and to seat the shoulder 23 in any one of the notches. With the long end of eccentric shoulder 23 seated on notch 11, the valve passage area is less than when the short end of shoulder 23 is seated on notch 12. The same is true of the relation of notches 10 and 11 and notches 9 and 10 to the eccentric shoulder 23, and it will be seen that as the shoulder 23 approaches notch 9 the valve passage area decreases accordingly.

With the short end of the eccentric shoulder 23 seated on notch 9, the end 18 of the plunger does not touch the ball 5, and the valve is thus allowed to completely close. With the long end of shoulder 23 seated on notch 9 the end 18 barely opens the ball valve. This is the finest locked adjustment possible with my valve. I call attention to the fact, however, that if it is not desired to lock the shoulder 23 in the various notches 9, 10, 11 and 12, another passage area adjustment of the valve can be obtained on each notch by allowing either of the long sides of shoulder 23 to seat on the desired notch. Including this sidewise adjustment of the eccentric shoulder 23 on each notch, I provide a total of 12 different passage area adjustments of the valve. The passage area of each adjustment will of course depend on the size of the eccentric shoulder 23, the location of the axis of rotation of said shoulder, the distance of the notches 9, 10, 11, and 12 from the ball valve, and the maximum passage area of the ball valve. The relation of these can be varied to obtain a given passage area for each adjustment, if desired.

Different predetermined passage area adjustments would be desirable for ice manufacturing plants which operate under different air pressures. Some plants operate on as little as one and one-half pounds pressure and some use as much as fifteen pounds pressure. The purity and condition of the water used at various plants would also govern the desired passage area adjustments. Most plants harvest only a portion of the plant capacity at one time, immediately refilling the empty cans with water for freezing new blocks. The newly filled cans need considerably more air volume than cans in which the water is partially frozen. As the various partially frozen blocks near the completely frozen stage a decreasing volume of air is needed. By using my device the air volume being supplied to the various partially frozen blocks can be reduced to the desired point, and a corresponding increase in pressure is built up in the rest of the air line. This increased pressure is available for the blocks just beginning to freeze. By spreading the air volume in this manner a plant can be operated more efficiently, with a smaller air blower, and with less power consumption than at present.

When the blocks in certain can baskets are almost ready for harvest the air laterals (the ends of which are secured to the end 15 of valve stem 22) can be easily disconnected from the air header line by a quarter turn of key 21 which will permit shoulder 23 to pass from the notch on which it is seated through slot 8 and out slot 7 of body 1. The ball check valve in body 1 will automatically close as valve stem 22 is withdrawn from body 1.

Having thus described the construction and operation of the embodiment shown in Figs. 1, 2, and 4, I will now describe the embodiment shown in Fig. 5.

The main difference lies in the type of check valve used. In the Fig. 5 embodiment I use a barrel check valve in body 1. The control bore of the body 1 in Fig. 5 is of the same diameter throughout. An annular taper valve seat 30 is formed at the threaded end 2 of body 1. A barrel check 33 carries a correspondingly shaped annular valve head 31 on its cylindrical body 32. The valve body 32 fits loosely inside the threaded end of body 1. On opposite sides of its wall body 32 has two oval shaped aligned through perforations, one of which is shown in Fig. 5 and designated by numeral 34. After insertion into body 1, the body 32 is slidably retained therein by pin 35 passing through said oval perforations and having its opposite ends firmly secured in the walls of body 1. The lengthwise movement of body 32 is limited by pin 35 contacting the edges of the two perforations in body 32. The barrel check 33 is actuated likewise by the valve stem 22. The inner end of barrel 33 is contacted and pushed away from its seat by the shoulder 19 on plunger 17, as the assembled valve stem 22 is inserted into body 1. In this embodiment the cross bars 24 and 25 are unnecessary and the end 18 of plunger 17 is open and unobstructed. The construction of the other parts of the device is the same as outlined for the first embodiment. The operation of the device is also the same as outlined for the first embodiment.

Obviously, the invention is susceptible of embodiment in forms other than that which is illustrated in the accompanying drawing and described herein, and applicable for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. A control valve comprising: a substantially hollow and cylindrical valve body; a ball check valve in one end of said valve body; a movable substantially hollow valve stem in the other end of said valve body, its inner end adapted to engage and open said valve; and co-operating means carried by said valve body and said stem for varying the degree of penetration of said stem into said valve body and for lockingly maintaining relative positions of the two in any one of a number of desired relations, said cooperating means comprising an open ended slot having notched diagonal branches connecting with its inner end formed in said valve body, and a pivotally mounted eccentric pin carried by said stem for seating in the notches of said diagonal branches.

2. A control valve comprising: a valve body; a valve in one end thereof; a removable valve stem adapted to slide into the other end of said valve body and to open, partially open and to allow said valve to completely close depending on the degree of penetration of said stem into said valve body; and co-operating means carried by said stem and said body for varying said degree of penetration, and for lockingly maintaining the relation of the two in any one of a number of predetermined degrees of penetration, said cooperating means comprising an open ended slot having notched diagonal branches connecting with its inner end formed in said valve body, and a pivotally mounted eccentric pin carried by said stem for seating in the notches of said diagonal branches.

3. In a control valve: a valve body; a pressure closed valve in one end thereof having a maximum predetermined passage area; a removable hollow valve stem adapted to slidably penetrate into the other end of said valve body, and to engage, open, and vary the passage area through said valve depending on the degree of penetration of said stem into said body; and co-operating means carried by said valve stem and said valve body for holding said stem in any one of a number of predetermined degrees of penetration with relation to said valve body, said cooperating means comprising an open ended slot having notched diagonal branches connecting with its inner end formed in said valve body, and a pivotally mounted eccentric pin carried by said stem for seating in the notches of said diagonal branches.

4. In a control valve: a valve body; a pressure closed valve in one end thereof having a maximum predetermined passage area; a removable hollow valve stem adapted to slidably penetrate into the other end of said valve body, and to engage, open, and vary the passage area through said valve depending on the degree of penetration of said stem into said body; and co-operating means carried by said valve stem and said valve body for selectively maintaining any one of a number of predetermined passage areas through said valve, said cooperating means comprising an open ended slot having notched diagonal branches connecting with its inner end formed in said valve body, and a pivotally mounted eccentric pin carried by said stem for seating in the notches of said diagonal branches.

5. In a control valve: a substantially hollow and cylindrical valve body having threads on one of its ends; a check valve in said valve body adjacent its threaded end; a longitudinal through slot in the wall of the opposite end of said body; a transverse through slot communicating therewith at an angle of greater than 90° thereto; a plurality of notches formed in the outer edge of said transverse slot, each notch located at a different distance from said valve; a removable substantially hollow valve stem one end being adapted to penetrate into said valve body, to engage and open said check valve, and to vary the passage area therethrough depending on its degree of penetration into said body; a control key rotatably mounted on said valve stem intermediate its ends; an eccentric elliptical shoulder on said control key formed to allow it to pass through said transverse slot as said valve stem is turned within said valve body, and adapted to adjustably seat on any one of said notches, and thereby to govern the degree of penetration of said stem into said body, and to lock said valve stem in any one of a number of predetermined degrees of penetration with relation to said valve body.

6. A control valve comprising: a substantially hollow and cylindrical valve body; a barrel check valve in one end of said valve body; a movable substantially hollow valve stem in the other end of said valve body, its inner end adapted to engage and open said valve; and co-operating means carried by said valve body and said stem for limiting the penetration of said stem into said valve body for varying the degree of penetration of said stem into said valve body, and for maintaining relative positions of the two in any one of a number of predetermined relations, said co-operating means comprising an open ended slot having notched diagonal branches connecting with its inner end formed in said valve body, and a pivotally mounted eccentric pin carried by said stem for seating in the notches of said diagonal branches.

7. Organization as described in claim 3 including an annular packing ring surrounding and secured to said stem adapted to seal said stem with the inner wall of said valve body.

FRED I. CLARK.